United States Patent
Lu et al.

(10) Patent No.: US 7,448,045 B1
(45) Date of Patent: Nov. 4, 2008

(54) METHOD AND APPARATUS TO EXTEND A PROGRAM

(75) Inventors: Zihong Lu, Cupertino, CA (US); Tim Flagg, Palo Alto, CA (US); Larry Ackner, Los Altos, CA (US)

(73) Assignee: Extreme Networks, Santa Clara, CA (US)

( * ) Notice: Subject to any disclaimer, the term of this patent is extended or adjusted under 35 U.S.C. 154(b) by 455 days.

(21) Appl. No.: 10/137,772

(22) Filed: Apr. 30, 2002

(51) Int. Cl.
*G06F 9/44* (2006.01)

(52) U.S. Cl. .................. 719/315; 717/108; 717/116; 707/1

(58) Field of Classification Search ............ 719/330, 719/315; 715/760; 709/201; 717/108, 116; 707/1
See application file for complete search history.

(56) References Cited

U.S. PATENT DOCUMENTS

| | | | | |
|---|---|---|---|---|
| 5,905,987 A * | 5/1999 | Shutt et al. | ............ | 707/103 R |
| 6,014,666 A * | 1/2000 | Helland et al. | ............ | 707/9 |
| 6,134,559 A * | 10/2000 | Brumme et al. | ......... | 707/103 R |
| 6,208,952 B1 * | 3/2001 | Goertzel et al. | ............ | 709/230 |
| 6,301,710 B1 * | 10/2001 | Fujiwara | ............ | 717/175 |
| 6,360,230 B1 * | 3/2002 | Chan et al. | ............ | 707/103 R |
| 6,629,123 B1 * | 9/2003 | Hunt | ............ | 718/106 |
| 6,658,429 B2 * | 12/2003 | Dorsett, Jr. | ............ | 707/104.1 |
| 6,768,994 B1 * | 7/2004 | Howard et al. | ............ | 707/10 |
| 6,971,109 B1 * | 11/2005 | Williams et al. | ............ | 719/318 |
| 2002/0029296 A1 * | 3/2002 | Anuff et al. | ............ | 709/311 |
| 2002/0199031 A1 * | 12/2002 | Rust et al. | ............ | 709/315 |

* cited by examiner

*Primary Examiner*—Meng-Ai An
*Assistant Examiner*—Phuong N. Hoang
(74) *Attorney, Agent, or Firm*—Blakely, Sokoloff, Taylor & Zafman LLP (57) ABSTRACT

A program may be extended to another program in accordance with information stored in a meta data file. A parent program is associated with the meta data file, and a child program is associated with a child description file created to conform to the information provided in the meta data file. The child description file is stored in a well-known location where it may be accessed by the parent program to learn how communicate with the child program, including which arguments and parameters to use, advantageously providing parent programs with a consistent user interface when interfacing with various child programs as well as the flexibility to add or change child description files to describe new or changed child programs as the need arises.

35 Claims, 8 Drawing Sheets

METHOD AND APPARATUS TO EXTEND A PROGRAM

TECHNICAL FIELD

The invention generally relates to the field of computer programming and, more particularly, to a method and apparatus to extend a computer program.

BACKGROUND AND RELATED ART

Computer software programs are often designed to call (invoke) other programs. Generally the called program serves a function not provided as part of the calling program. The calling program is variously referred to as a "client" or a "parent" program and the called programs are referred to as "server" or "child" programs. For ease of explanation, the parent—child designations are used in the description that follows.

In order to call a child program, the parent program must know how to communicate with the child program, including how to call the child program, and what arguments or parameters to provide. In the prior art it is common for the parent program to call known child programs with which the parent program is already familiar, or to call child programs that have been designed to conform to a call format prescribed by the parent program. However, this requirement is too rigid for some applications which depend on child programs that are developed independently of the parent program.

For example, computer-aided circuit design (CAD) applications (the parent program) depend on the feedback of third-party simulation programs (the child programs) to compare circuits with their specifications via trial and error simulation and automatic iteration. The parent program provides the circuit design and the automatic iteration algorithm but relies on the third-party child program to do the simulation.

Another example is a computer network health check monitoring program, where the parent program provides a framework for checking different protocols, processing and saving data, and acting upon different criteria detected in the data. Typically, the parent program supports various protocol checking modules that work well with the parent program's framework. However, the user may want to add other protocol checking modules that do not work well with the parent program's existing framework, such as those developed by third parties, or those developed for new protocols that were not originally supported by the parent program. For example, the protocol modules may require completely different invocation methods or parameters, or may result in new actions when certain criteria are detected.

One approach to overcoming this problem is to have the parent program use one fixed entry point, or common interface, into the child program. This approach requires every child program to implement the common interface. An example of this method of extending a program is Microsoft's Component Object Model (COM). COM defines a standard for component interoperability that allows components made by different software vendors to be combined into a variety of applications. The COM components can include parent programs and child programs where the parent programs operate as clients of the child programs, and the child programs operate as servers.

In COM the parent and child programs interact with each other through a collection of functions, referred to as interfaces. The interfaces are defined using the COM Interface Definition Language (IDL). Each child program (COM server) uses a fixed entry point, or common interface, that must be implemented by all of the COM components, referred to as the IUnknown interface. Component-specific functions and interfaces are negotiated using the IUnknown interface. The COM components are registered in the Windows registry. When a parent program calls the child program, the Windows Service Control Manager (SCM) uses the entries in the Windows registry to invoke the child program (COM server component) according to the common interface.

One of the drawbacks to COM is that all of the parent programs (COM clients) wishing to call the child program (the COM server) must use the common IUnknown interface. Specifically, the parent program (the COM client) may require a fixed customized interface that each child program (COM server) must implement, and that interface must inherit the IUnknown interface. As a result, COM does not provide any flexibility in program invocation. That is, the parent program (the COM client) cannot vary the way in which it calls a child program (COM server). This lack of flexibility makes COM unusable in situations where the parent program (COM client) and the child program (COM server) are developed independently of one another, or where there is a need to vary the way in which the child program (COM server) is called.

Another drawback to COM is the lack of consistent user interface (UI). In COM, each child program (COM server) component provides their own UI. From the parent program (COM client) point of view, this means that each of the of the child programs it needs to call may provide a different look and feel, which may be cumbersome for the parent program to implement.

SUMMARY

A method is provided in which a program may be extended to another program in accordance with information stored in a meta data file. According to one aspect of the present invention, a parent program is associated with the meta data file, and a child program is associated with a child description file. The child description file is created to conform to the information provided in the meta data file. According to one aspect of the present invention, the meta data file comprises rules defined in accordance with a scripting language, and the child description file comprises descriptions of information specific to a particular child program using the rules provided in the meta data file.

According to one aspect of the present invention, the child description file is stored in a well-known location where it may be accessed by the parent program. The information contained in the child description file describes how to invoke the child program and establish communication between the parent program and the child program, including which arguments and parameters to use. This advantageously permits the parent programs to have a consistent user interface when interfacing with various child programs, while at the same time providing the flexibility to add or change child description files to describe new or changed child programs as the need arises.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above and other methods.

BRIEF DESCRIPTION OF THE DRAWINGS

The present invention is illustrated by way of example, and not necessarily by way of limitation, in the figures of the accompanying drawings in which like reference numerals refer to similar elements and in which.

DETAILED DESCRIPTION

In the following description, various aspects of the present invention, a method to extend a program, are described. Specific details are set forth in order to provide a thorough description; however, it is understood by those skilled in the art that embodiments of the present invention may be practiced with only some or all of these aspects, and with or without some or all of the specific details. In some instances, well-known features may be omitted or simplified in order not to obscure the understanding of this description.

Parts of the description are presented in terms of operations performed by a computer system, using terms such as data, name, type, default, value, precision, choice list, nullability, parameters, arguments and the like, consistent with the manner commonly employed by those skilled in the art to convey the substance of their work to others skilled in the art. As is well understood by those skilled in the art, some of these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Various operations are described as multiple discrete steps performed in turn in a manner that is most helpful in understanding the present invention. However, the order of description should not be construed to imply that these operations are necessarily performed in the order they are presented, or even order dependent. Lastly, repeated usage of the phrase "in one embodiment" does not necessarily refer to the same embodiment, although it may.

Figure 1:
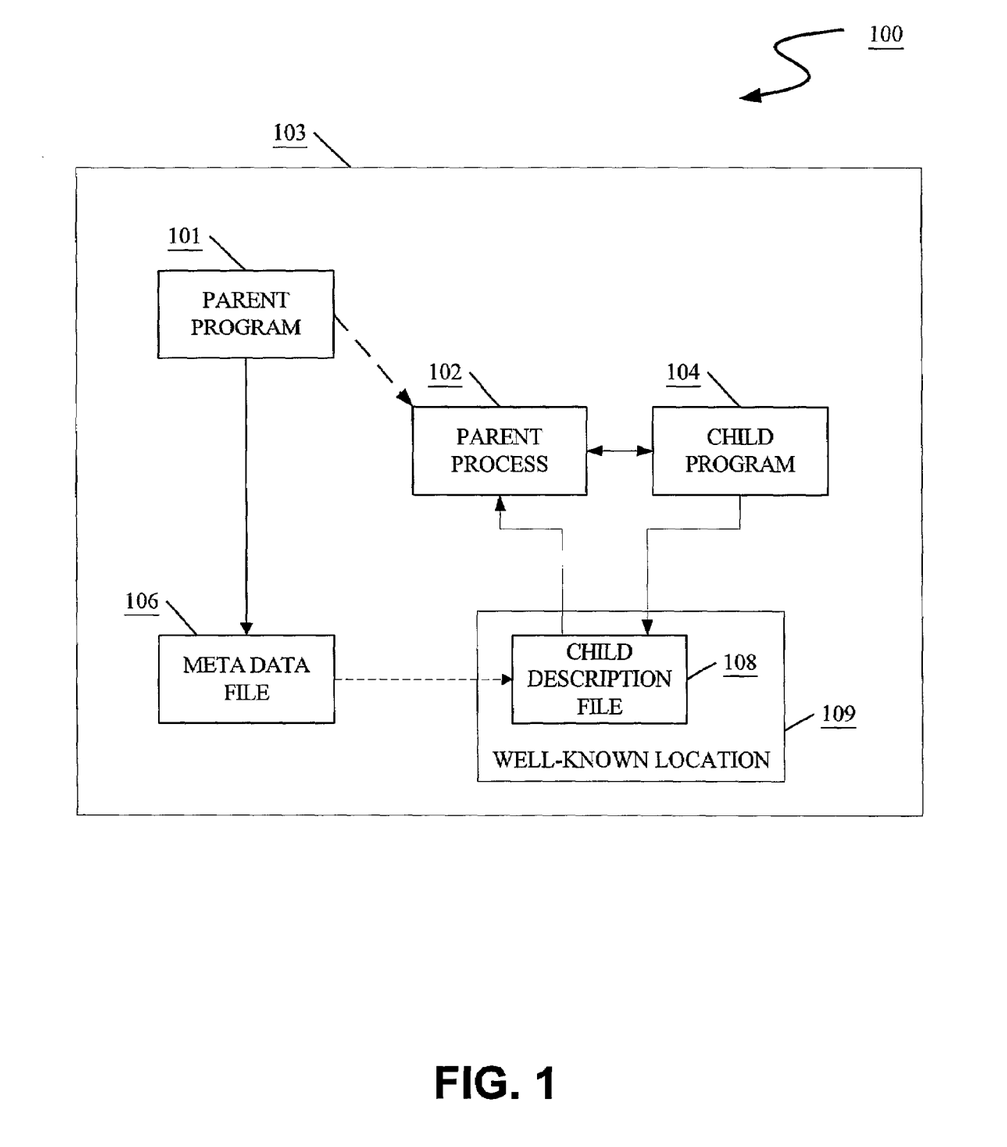
FIG. 1 is a block diagram illustrating certain aspects of the present invention according to one embodiment.

FIG. 1 is a block diagram illustrating an exemplary parent program 101 and child program 104 incorporating a program extension system 100 in accordance with one embodiment of the invention, and the operating environment in which certain aspects of the invention may be practiced. As shown, a parent process 102 is an instance of a parent program 101 running on a computer 103. The parent program 101 is associated with a meta data file 106 that describes certain language constraints and rules which the parent process 102 will need to understand at compile time in order to successfully implement a call to the child program 104 at run time. In a similar fashion, the child program 104 is associated with a child description file 108 that, at compile time, conforms to the language constraints and rules described in the meta data file 106 so that the child program 104 can successfully communicate with the parent process 102 at run time.

In one embodiment, the meta data file 106 is comprised of language constraints and/or rules that may be defined using a meta-language, that is a language which describes the rules for describing the data such as the Standard Generalized Markup Language (SGML) or the Extensible Markup Language (XML). The meta-languages provide a flexible way to create common information formats which may be used by several different programs. For example, the definition of the meta data file 106 may consist of XML tags defined in an application framework of the parent program 102. The XML tags provide the means for describing the arguments, parameters, or other data needed by the parent program 102 in order to successfully communicate with the child program 104.

In one embodiment, the child description file 108 may be created by a system administrator or some other similarly qualified person who has access to the descriptions of the data in meta data file 106. It an alternative embodiment, the child description file 108 may be created by an automated function or other process as part of a start-up procedure for the child program 104. Either way, the child description file 108 is placed in a "well-known" location 109 previously specified by the parent program 102. As is understood by those skilled in the art, the well-known location 109 may be any of various locations in computer 103 including a predefined directory, one or more designated tables in a predefined database, a configuration file or initialization file of computer 103 that lists all of the search paths for all of the available child programs 104 and associated child description files 108, or a registry of an operating system such as Microsoft Windows that lists the same or similar information regarding the available child programs 104 and associated child description files 108. In one embodiment, the well-known location 109 may even be on another computer 103 or external storage device accessible to the parent program 101, parent process 102 and child program 103.

Figure 2:
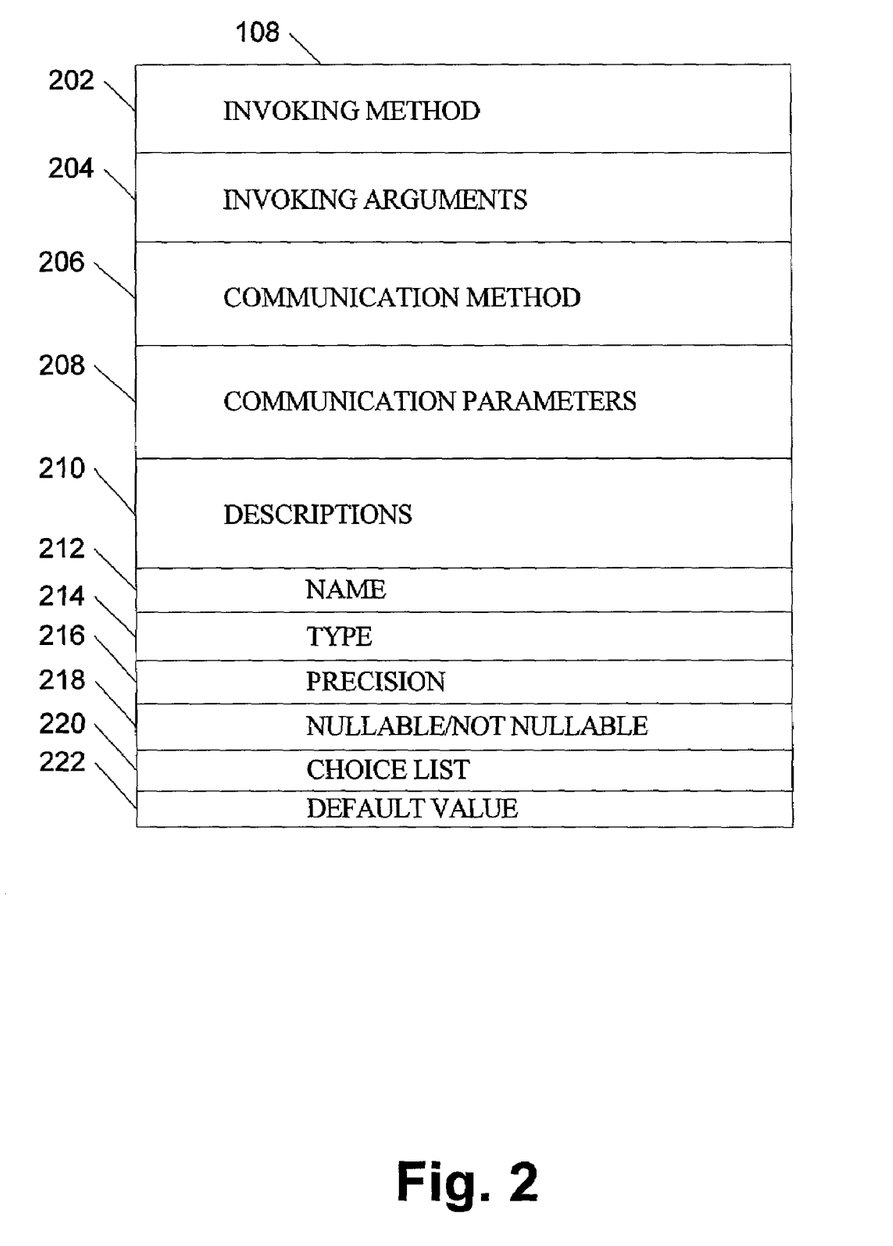
FIG. 2 is a diagram illustrating an example child description file, according to one embodiment of the present invention.

FIG. 2 is a data structure diagram illustrating some of the data present in the child description file 108 according to one embodiment of the present invention. The child description file 108 comprises information specific to a particular child program 104, and may include methods 202 for invoking the child program 104, arguments 204 used in invoking the child program 104, a communication method 206 to be used to establish communication between the parent program 102 and the child program 104, and parameters 208 used in the communication between the parent program 102 and child program 104.

In one embodiment, child description file 108 further includes descriptions 210 of the invoking arguments 204 and communication parameters 208. The descriptions 210 may include parameter or argument name 212, type 214, precision 216, an indication of whether or not the parameter/argument may be null (nullability) 218, a choice list 220, and a default value 222. In operation, the parent program 102 may use the descriptions 210 of arguments 204 and parameters 208 for a variety of purposes, such as using the choice list 220 to prompt users for certain input values or using the type 214, precision 216, and nullability 218 to perform data validation.

It should be noted that the order of illustration in FIG. 2 of the data in child description file 108 is made for the ease of description and by way of example and is not meant to limit the scope of the present invention. Moreover, as is understood by those skilled in the art, the data in child description file 108 may vary depending on the needs and structure of child program 104 and parent program 102. Those skilled in the art will further recognize that there may be alternative combinations of data in child description file 108 not illustrated in FIG. 2, but which are within the scope of the present invention.

Figure 3:
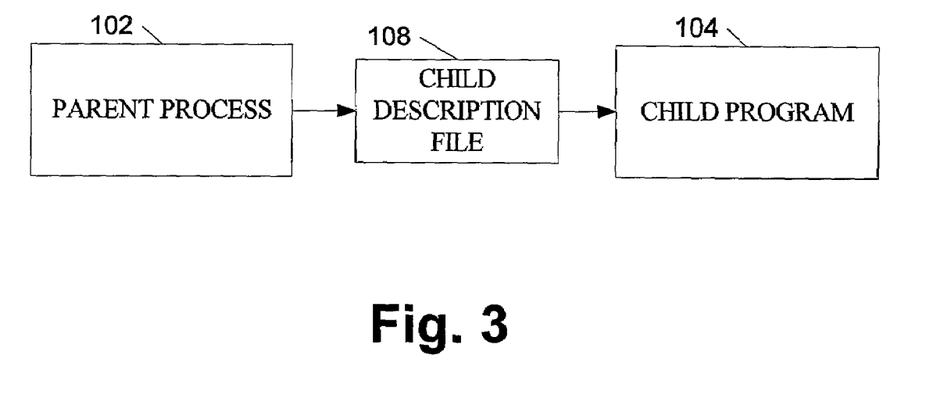
FIG. 3 is a block diagram of an example parent program being extended to a child program in accordance with one embodiment of the present invention.

FIG. 3 is a block diagram illustrating certain aspects of the operation of the program extension system 100 of FIGS. 1-2 in accordance with one embodiment. The parent program 101 creates an instance of itself in a parent process 102, and the parent process 102 extends the parent program's functionality by calling the child program 104. The parent process 102 locates the child program's child description file 108 in the well-known location 109 as described above, and uses the invoking method 202 obtained from child description file 108 to invoke the child program 104. It should be understood by those skilled in the art that the parent program 101 may also extend its functionality by calling the child program 104 directly without instantiating a parent process 102. Accordingly, in the discussion that follows, the parent program 101 may act in place of the parent process 102, without departing from the scope of the invention.

Figure 4:
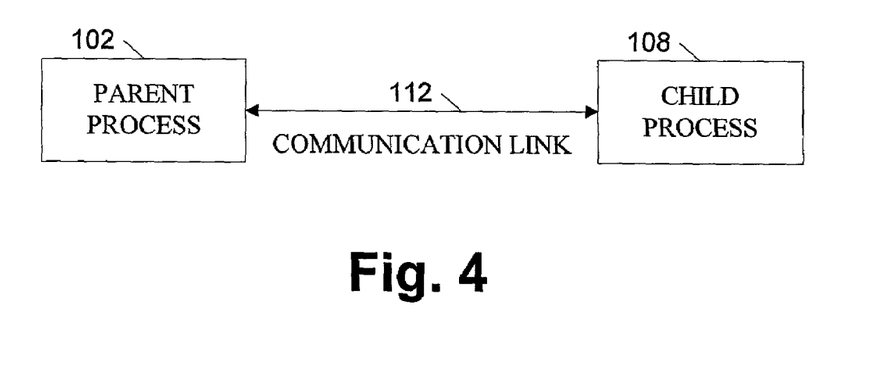
FIG. 4 is a block diagram of an example parent program communicating with a child program in accordance with one embodiment of the present invention.

FIG. 4 is a block diagram illustrating certain other aspects of the operation of the program extension system 100 of FIGS. 1-2 in accordance with one embodiment. The parent process 102 uses the communication method 206 obtained from the child description file 108 to establish a communication link 112 with the child program 104. Once the communication link 112 is established, commands and data may flow between the parent process 102 and the child program 104, thereby extending the functionality of the parent program 101 to include the functionality of the child program 104. Typical communication methods 206 used to establish communication link 112 include, among others, Transmission Control Protocol/Internet Protocol (TCP/IP), Uniform Datagram Protocol (UDP), Inter-Process Communication (IPC), flat files, or named pipes.

Figure 5:
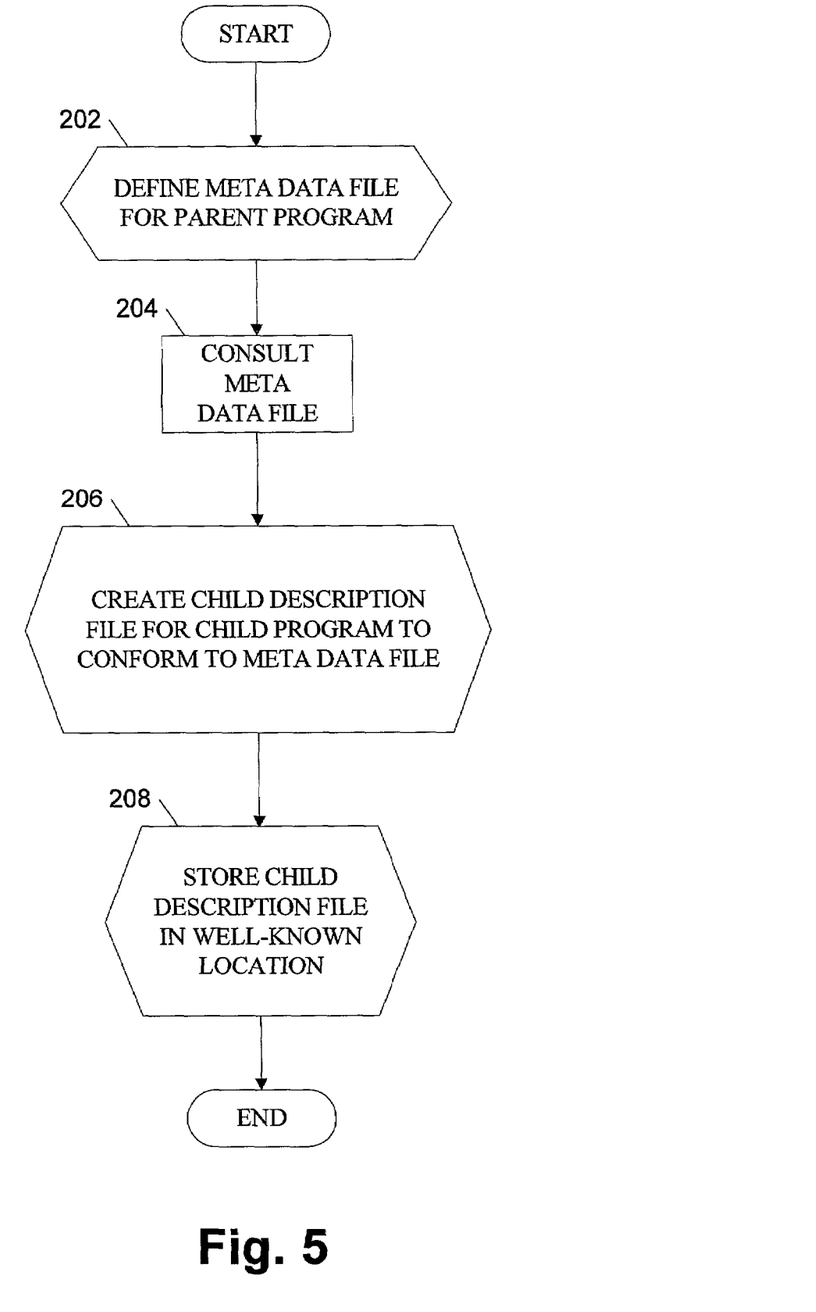
FIG. 5 is a flow diagram illustrating certain aspects of a method to be performed by a computer executing one embodiment of the illustrated invention.
Figure 6:
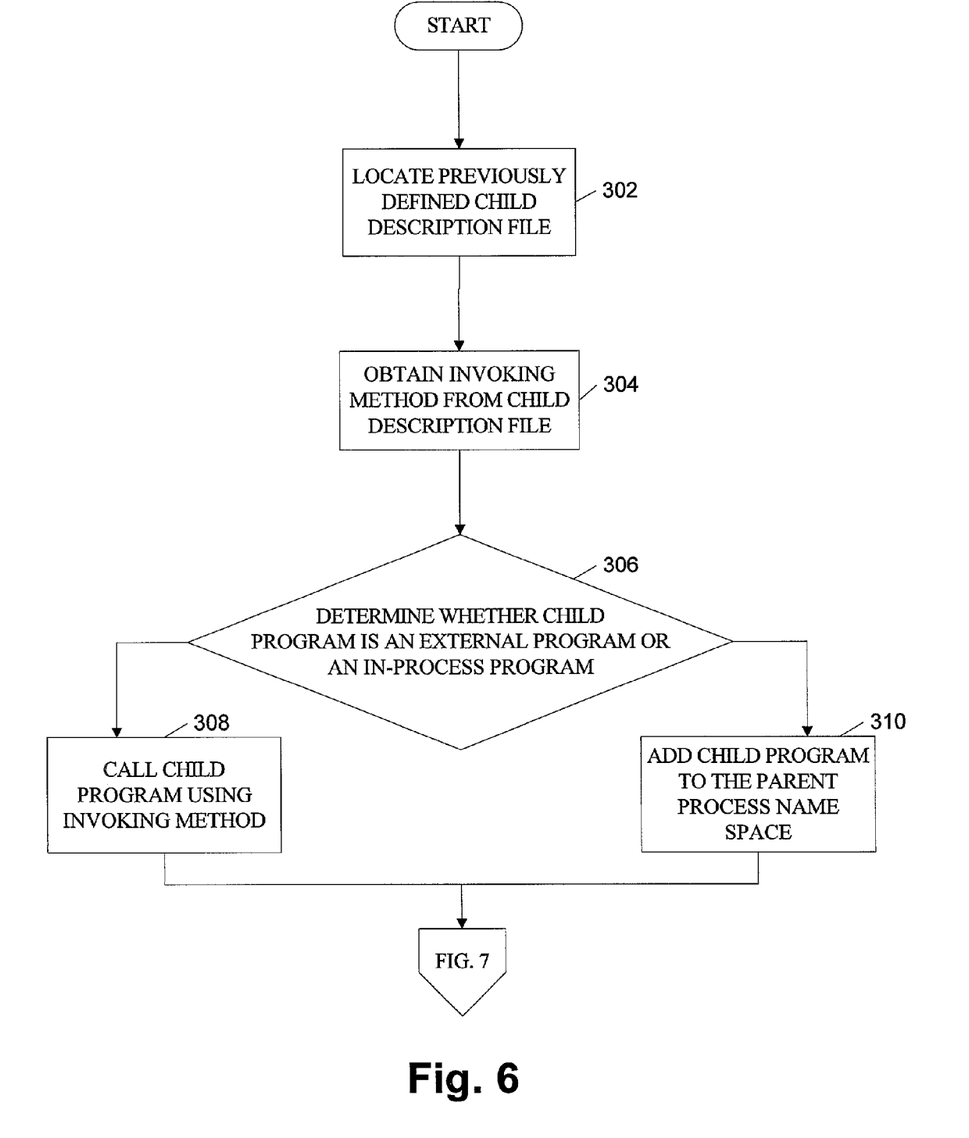
FIG. 6 is a flow diagram illustrating certain aspects of another method to be performed by a computer executing one embodiment of the illustrated invention.
Figure 7:
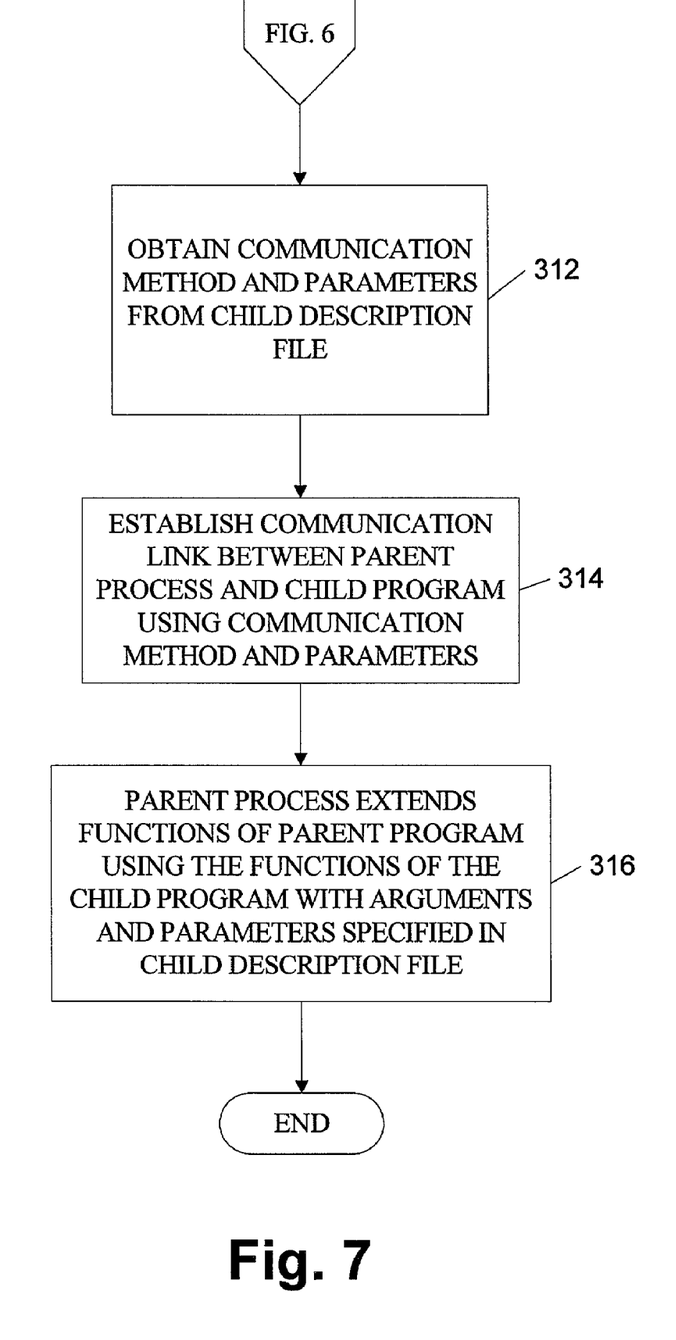
FIG. 7 is a flow diagram illustrating certain aspects of yet another method to be performed by a computer executing one embodiment of the illustrated invention.

Turning now to FIGS. 5-7, the particular methods of the invention are described in terms of computer software with reference to a series of flowcharts. The methods to be performed by a computer constitute computer programs made up of computer-executable instructions. Describing the methods by reference to a flow diagram enables one skilled in the art to develop such programs including such instructions to carry out the methods on suitably configured computers (i.e., the processor or processors of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems or without an operating system.

In addition, the present invention is not described with reference to any particular programming language. It is appreciated that a variety of programming languages may be used to implement the teachings of the invention as described herein. Furthermore, it is common in the art to speak of software, in one form or another (e.g., program, procedure, process, application), as taking an action or causing a result. Such expressions are merely a shorthand way of saying that execution of the software by a computer causes the processor or processors of the computer to perform an action or to produce a result.

Referring to FIG. 5, certain aspects of a method to be performed by the program extension system 100 described in FIGS. 1-4 when executing one embodiment of the present invention are shown. In particular, FIG. 5 illustrates some of the acts to be performed by a computer 103 in preparation for extending a parent program 101 to a child program 104.

In one embodiment, at preparation block 202, at compile time, a meta data file 106 is defined for a parent program 101. In one embodiment, the meta data file 106 is defined by the parent program designer or possibly an administrator of the application or system to which the parent program belongs. As previously noted, the meta data file 106 may be defined using a meta-language such as XML or SGML, in which case the meta data file 106 may be comprised of XML tags and corresponding values. The XML tags provide the means for describing the arguments, parameters, or other data needed by the parent program 102 in order to successfully communicate with the child program 104.

At process block 204, at compile time, the child program's designer or possibly an administrator of the application or system to which the parent program belongs, consults the previously defined meta data file 106 in order to determine how to create a corresponding child description file 108 that will conform to the rules for creating the file as specified in the meta data file 106. As previously noted, the child description file 108 may be created by an automated function or other process as part of a start-up procedure for the child program 104. In one embodiment, at preparation block 206, the child description file 108 may be created from an instance of the meta data file 106. It should be understood by one skilled in the art that other methods of creating the child description file 108 may be employed without departing from the scope of the invention, as long as the child description file 108 conforms to the rules specified in the meta data file 106.

At preparatory block 208, the child description file 108 is stored in one of the well-known locations 109 in the computer 103, as specified in a configuration file or other type of initialization file of a system running on computer 103. For example, in one embodiment, the well-known location 109 might be specified in an ".ini" file in a computer running the Microsoft Windows operating system.

Figure 8:
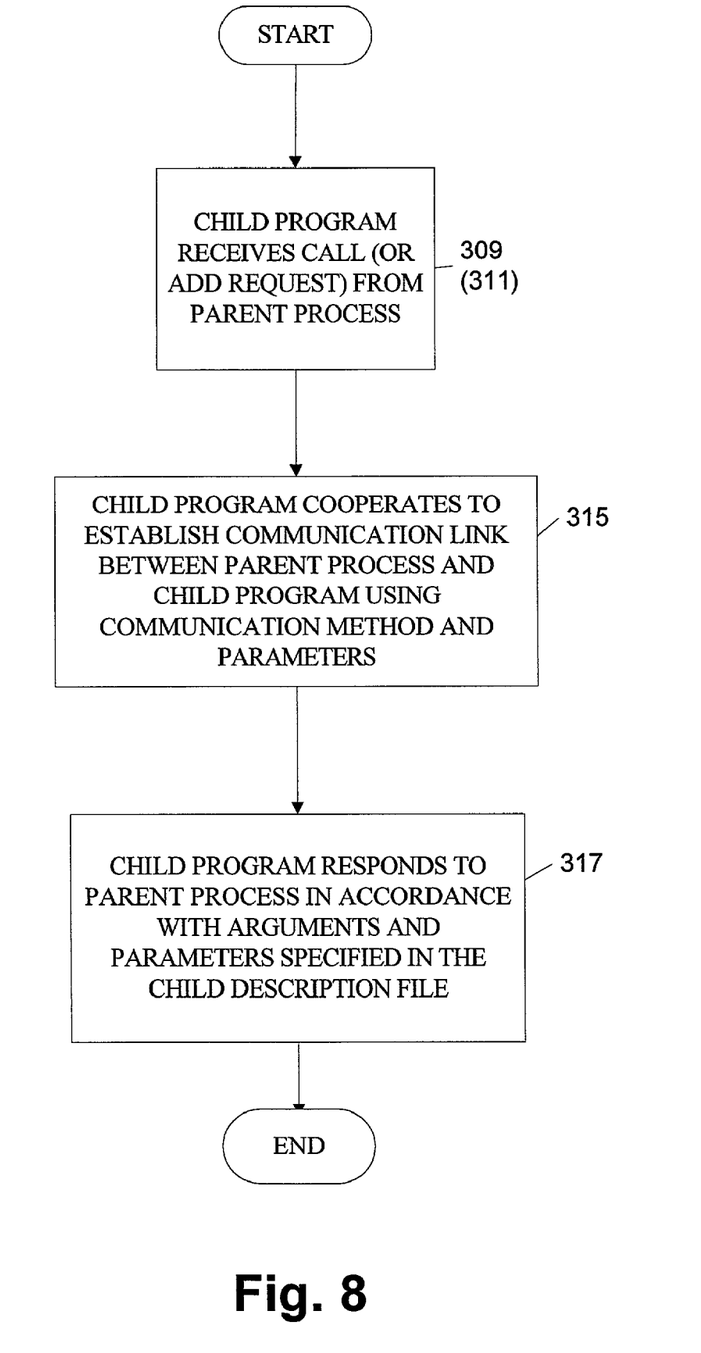
FIG. 8 is a flow diagram illustrating certain aspects of yet another method to be performed by a computer executing one embodiment of the illustrated invention.

Referring to FIGS. 6-8, certain additional aspects of a method to be performed by the program extension system 100 described in FIGS. 1-4 when executing one embodiment of the present invention are shown. In particular, FIGS. 6-8 illustrates some of the acts to be performed by a computer 103 when extending a parent program 101 to a child program 104.

It should be understood by one skilled in the art that the present invention may be practiced with programs and processes written in any language, whether compiled or interpreted. When both the parent process 102 (or parent program 101) and the child process 104 are written in the same interpreted language, the child process 104 may be added to the process name space of the parent process 102 for execution. FIG. 6 illustrates some of the acts to be performed by a computer 103 when applying the present invention to both compiled and interpreted processes in accordance with one embodiment.

At processing block 302 the parent process 102 locates the previously defined child description file 108 for the child program 104 of interest by searching the well-known locations 109 in computer 103. Once located, the parent process 102 obtains the invoking method 202 from the child description file 108. At decision block 306, the parent process 102 determines from the value of the invoking method 304 whether the child program 104 is an external program or an internal program, also referred to as an in-process program.

At processing block 308, when the child program 104 is an external program, the parent process 102 calls the child program 104 using the specified invoking method 202 obtained from the child description file 108. However, at processing block 310, when the child program 104 is an internal or in-process program, the parent process 102 does not call the child program 104, but instead adds the child program 104 to the parent program's process name space for execution.

Referring now to FIG. 7, once the child program 104 has been called or has been added to the parent program's process name space, processing continues at process block 312, where the parent process 102 obtains the communication method 206 and any communication parameters 208 from the child description file 108. At processing block 314, the parent process 102 establishes a communication link 112 between the parent process 102 and the child program 104 using the previously obtained communication method 206 and any communication parameters 208. At processing block 316, the parent process 102 completes extending the functions of the parent program 101 to include the functions of the child program 104 by commencing interaction with the child program 104 using invoking arguments 204 and communication parameters 208 previously obtained from the child description file 108, including the descriptions 210 of those arguments and parameters as needed.

Referring to FIG. 8, at processing block 309 the child program 104 receives a call from the parent process 102 to initiate extending the functions of the parent program 101 to include those of the child program 104. In one embodiment, at processing block 310, when the child program 104 is an in-process component of the application framework of the parent program 101, the child program 104 receives the request from the parent process 102 to add the child program 104 to the parent program's process name space. At processing block 315, the child program 104 cooperates with the parent process 102 to establish the communication link 112 between the parent process 102 and the child program 104, using the communication method 206 and parameters 208 specified in the child description file 108. At processing block 317, the child program 104 responds to the parent process 102 in accordance with the invoking arguments 204 and parameters 208 specified in the child description file 108.

Turning now to an example implementation of a program extension system 100 in accordance with one embodiment, an application framework is described which includes a parent program 101 named ServiceScheduler. The ServiceScheduler program schedules when to call a child program 104 in the application framework to perform actions such as pinging a web site, verifying an http web page, etc. In addition, in accordance with an embodiment of the program extension system 100, at compile time a meta data file 106 has been defined for the ServiceScheduler, which allows extending the functionality of the ServiceScheduler to third party programs. In the example implementation the meta data file 106 has been created using XML tags predefined in the application framework.

An example of a meta data file 106 in the application framework for the ServiceScheduler program is a collection of XML tags CMD, INVOKE_CMD, ARGUMENT_LIST, ARG, COMMUNICATION, DATA_IN, DATAIN, DATA_OUT, and DATAOUT, which describes certain data which the ServiceScheduler parent program 101 (or corresponding parent process 102) will need in order to successfully call a child program 104.

The XML tags provide the information used to create the data in the child description file 108 as set forth in Table 1:

TABLE 1

Example Child Description File

| XML TAG | CHILD DESCRIPTION FILE 108 |
| --- | --- |
| INVOKE_CMD | Invoking Method 202 |
| ARGUMENT_LIST | Invoking Arguments 204 |
| ARG | Invoking Arguments 204 |
| COMMUNICATION | Communication Method 206 |
| DATA_IN | Input Invoking Arguments 204 |
| DATAIN | Input Argument Descriptions 210 |
| DATA_OUT | Output Invoking Arguments 204 |
| DATAOUT | Output Argument Descriptions 210 |

In the above example, the user wishes to extend the application framework to do more than just pinging the web sites as provided for in the original functionality of the ServiceScheduler parent program. Specifically, the user wishes to use the ServiceScheduler parent program to schedule a third-party temperature measurement application, called TempScan.exe, to perform resistance measurements in a certain temperature range every 30 minutes. In accordance with the program extension system 100, the user creates a child description file 108 that describes the TempScan.exe child program using the XML tags in the meta data file 106.

For example, using the XML tags in Table 1, the user creates a child description file 108, MyMetaFile.xml, for the TempScan.exe child program as follows:

```
<?xml version="1.0" ?>
<CMD>
    <INVOKE_CMD display_name="temperature scan"
                description="an example that uses temperature
            scanning app."
                type ="external"
                value="c:\MyDirectory\TempScan.exe " />
    <ARGUMENT_LIST>
        <ARG    name="port"
                type="integer"
                precision="4"
                choice_list=" "
                default="1234" />
        <ARG    name="controller_name"
                type="string"
                precision="100"
                choice_list="machine1|machine2|machine3"
                default="machine1" />
    </ARGUMENT_LIST>
    <COMMUNICATION method="TCP_IP" >
        <DATA_IN>
            <DATAIN     name="start_temperature"
                        type="integer"
                        precision="3"
                        choice_list=" "
                        default="500" />
            <DATAIN     name="end_temperature"
                        type="integer"
                        precision="3"
                        choice_list=" "
                        default="600" />
            <DATAIN     name="step_size"
                        type="float"
                        precision="2.1"
                        choice_list="1.0|1.5|2.0"
                        default="1.0" />
```

-continued

```
    <DATAIN    name="maximum_wait"
               type="integer"
               precision="5"
               choice_list=" "
               default="10" />
    </DATA_IN>
    <DATA_OUT>
        <DATAOUT   name="temperature" type="float" />
        <DATAOUT   name="response_time" type="float" />
        <DATAOUT   name="resistance" type="float" />
    </DATAOUT>
    </COMMUNICATION>
</CMD>
```

The user places the MyMetaFile.xml in a well-known location 109, such as designated directory which the parent program ServiceScheduler routinely searches. During execution, the ServiceScheduler reads MyMetaFile.xml, and determines from the INVOKE_CMD tag (invoking method 202) the specific command line that is needed to invoke the TempScan.exe application:

c:\MyDirectory\TempScan.exe port controller_name

ServiceScheduler also determines from the COMMUNICATION tag (communication method 208) and the multiple occurrences of the DATAIN tags (invoking arguments 204) that TempScan.exe expects a couple of input arguments (port, controller_name) and several input parameters (start_temperature, end_temperature, step_size, maximum_wait) to be provided by the ServiceScheduler through a TCP/IP communication channel. The ServiceScheduler program further determines from the multiple occurrences of the DATAOUT tags (invoking arguments 204) that the TempScan.exe program will provide in return three output arguments (temperature, response_time, resistance).

To set up a measurement schedule, the ServiceScheduler will prompt the user in a user interface to enter the required data so that it can invoke TempScan.exe with the required input arguments, including port, controller_name, and input parameters start_temperature, end_temperature, step_size, maximum_wait. Since two of the required data have been provided a choice list 220 description, the ServiceScheduler prompts the user with the list of choices in the user interface with a pull-down box. For example, the controller_name will be presented to the user as a pull down box with three choices: machine1, machine2, and machine3. The ServiceScheduler program will further validate the input data entered by the user against the descriptions 210 provided in the child description file 108, for example to make sure that an integer input data cannot have alpha character values, e.g. start_temperature and end_temperature, must have 3-digit integer values, whereas the step_size must be a floating point value with a precision of one-tenth.

After the schedule is set, the ServiceScheduler program invokes the TempScan.exe program using the earlier described command line in INVOKE_CMD, using the input data entered by the user. Since in this example, TempScan.exe is an external program (as indicated in the INVOKE_CMD type="external") the pseudocode call in ServiceScheduler might be expressed as follows:

CallExternalProgram ("C:\MyDirectory\TempScan.exe 8001 machine1")// port=8001
Socket=OpenSocket ("localhost", 8001)
SendDataThroughSocket (Socket, "start_temperature=500 end_temperature=600 step_size=1 maximum wait=30")
data=ReceiveData (Socket)
ParseData (data)
DoSomethingWithData ( )

When measurement application TempScan.exe is written in a scripting language that is compatible with the ServiceScheduler program, the call to the TempScan.exe child program may be performed as an in-process component. In that case, in addition to providing the XML tags, the application framework for the ServiceScheduler program further provides a class that has a virtual function, which the ServiceScheduler program implements as follows:

class ExtendClass:
    def CallExtend (datalist):
        pass

The virtual function CallExtend takes a list of data (datalist), which is passed to the in-process TempScan.exe child program. The child description file 108 is the same as before, except that the INVOKE_CMD and COMMUNICATION tag values are changed to reflect that the TempScan.exe child program is an internal program as follows:

<INVOKE_CMD display_name="temperature scan"
    description=-"an example that uses temperature scanning app."
    type=" internal"
    value="c: \MyDirectory\TempScan.py"
    classname="MyTempScanClass" />
. . .
<COMMUNICATION method="internal">
. . .

Here the ServiceScheduler determines from the INVOKE_CMD tag that the TempScan.exe child program is going to be in-process, and that it has a class called MyTempScanClass that inherits the class ExtendClass and implements the CallExtend function. The ServiceScheduler further determines that the TempScan.exe child program is located in c:\MyDirectory\TempScan.py. The ServiceScheduler program uses this information to instantiate an object from class MyTempScanClass and call the CallExtend ( ) virtual function with the expected list of data in a manner similar to calling the external program described above.

Figure 9:
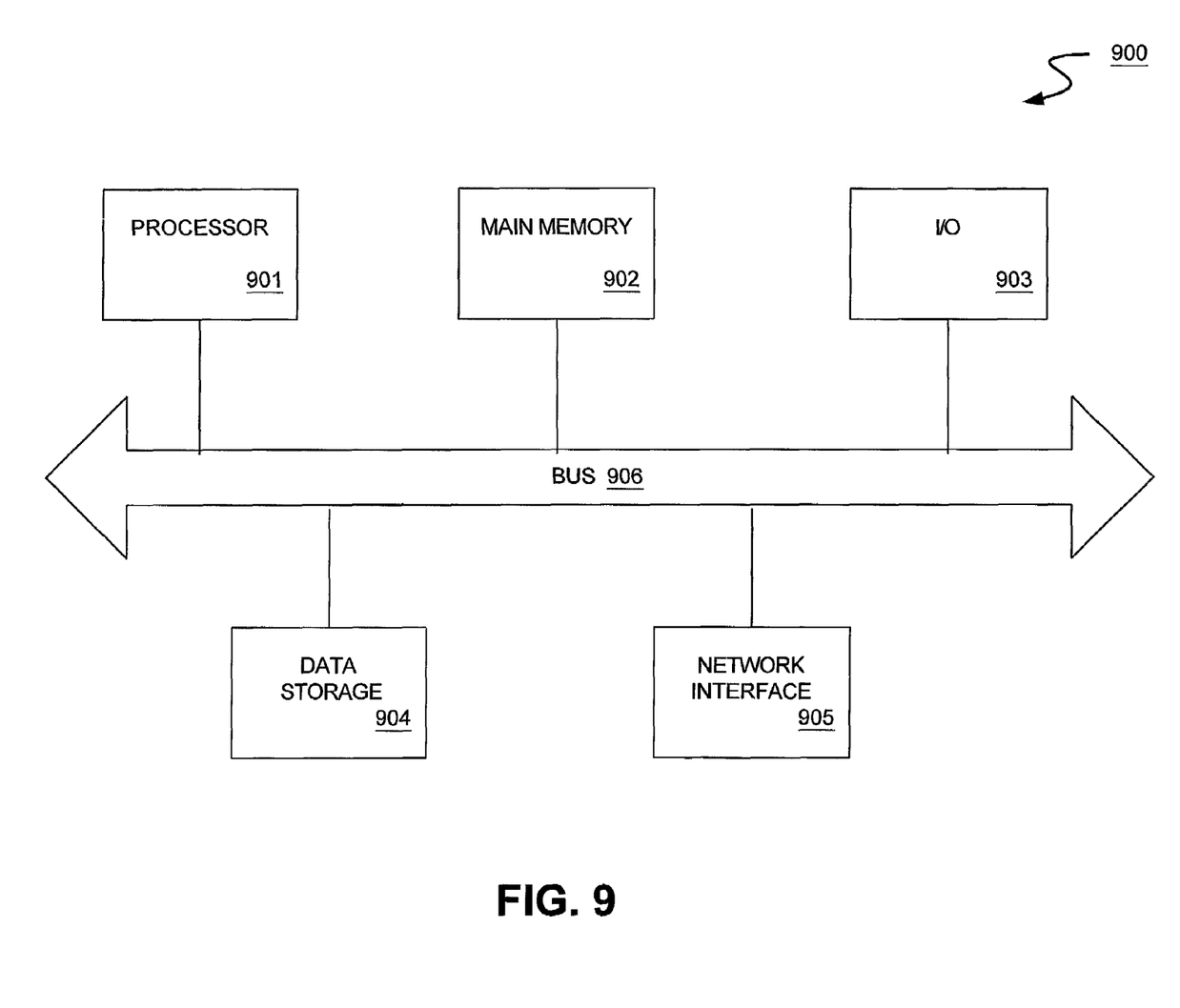
FIG. 9 illustrates a suitable computing environment in which certain aspects of the illustrated invention may be practiced.

FIG. 9 illustrates one embodiment of a suitable computing environment in which certain aspects of the invention illustrated in FIGS. 1-8 may be practiced. In one embodiment, the program extension system 100 may be implemented on a computer system 900 having components 901-906, including a processor 901, a memory 902, an Input/Output device 903, a data storage 904, and a network interface 905, coupled to each other via a bus 908. The components perform their conventional functions known in the art and provide the means for implementing the program extension system 100. Collectively, these components represent a broad category of hardware systems, including but not limited to general purpose computer systems and specialized packet forwarding devices.

In one embodiment, the memory component 902, may include one or more of random access memory (RAM), and nonvolatile storage devices (e.g., magnetic or optical disks) on which are stored instructions and data for use by processor 901, including the instructions and data that comprise the parent program 101, parent process 102, child program 104, meta data file 106, child description file 108, and other components of the program extension system 100.

The data storage component 904 may represent the storage areas for the well-known locations 109 of meta data file 106 and child description file 108 obtained by the program process 102, and any other storage areas used by program extension system 100.

It is to be appreciated that various components of computer system 900 may be rearranged, and that certain implementations of the present invention may not require nor include all of the above components. Furthermore, additional components may be included in system 900, such as additional processors (e.g., a digital signal processor), storage devices, memories, network/communication interfaces, etc.

In the illustrated embodiment of FIG. 9, the method and apparatus for extending a program in accordance with one embodiment of the invention as discussed above may be implemented as a series of software routines executed by computer system 900. The software routines may comprise a plurality or series of instructions, code sequences, configuration information, or other data to be accessed and/or executed by a processing system such as one or more of processor 901. Initially, the series of instructions, code sequences, configuration information, or other data may be stored on a data storage 904 and transferred to memory 902 via bus 908. It is to be appreciated that the series of instructions, code sequences, configuration information, or other data can be stored a data storage 904 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be on a propagated data signal received from a remote storage device, such as a server on a network, via a network/communication interface 905. The instructions, code sequences, configuration information, or other data may be copied from the data storage 904, such as mass storage, or from the propagated data signal into a memory 902 and accessed and executed by processor 901.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for a method and apparatus for extending a program. From the foregoing description, those skilled in the art will recognize that many other variations of the present invention are possible. In particular, while the present invention has been described as being implemented in a computer system 900, some of the logic may be distributed in multiple such computer systems in a network or internetwork application. Thus, the present invention is not limited by the details described. Instead, the present invention can be practiced with modifications and alterations within the spirit and scope of the appended claims.

What is claimed is:

1. A computer-implemented method for extending a parent program to include the functionality of a child program, comprising:

selecting a child description file from a plurality of child description files, wherein the child description file contains fully customizable information describing how to invoke the child program and establish communication between the parent program and the child program, the information conforming to the language constraints and rules defined in a meta data file associated with the parent program;

accessing an invoking method indicator in the child description file, the invoking method indicator specifying an invoking method;

accessing a communication method indicator in the child description file, the communication method indicator specifying a communication method; accessing an invoking argument in the invoking method of the child description file, wherein the invoking argument is used to pass a parameter data between the parent program and the child program; and providing a user interface to receive user input data for an the first invoking argument if the first invoking argument data for the first invoking argument is not provided in the child description file, wherein the input data is validated against an invoking argument description provided in the child description file or constrained by a choice list description provided in the child description file; wherein the invoking argument specifies a description for the parameter data, the description including any of a name, type, precision, nullability, choice list, and default value.

invoking the child program from the parent program using the invoking method; and establishing communication between the parent program and the child program using the communication method.

2. The computer-implemented method of claim 1, further comprising:

placing a first child description file in a well-known location that is accessible to the parent program, wherein the parent program searches for the first child description file in the well-known location prior to invoking the child program and establishing communication between the parent program and the child program in absence of any standard interface shared by the parent program and child program.

3. The computer-implemented method of claim 2, where the well-known location is a preset directory.

4. The computer-implemented method of claim 2, were in the well-known location is a search path obtained from a configuration file.

5. The computer-implemented method of claim 2, wherein the well-known location is a registry of an operating system.

6. The computer-implemented method of claim 5, when the operating system is Microsoft Windows.

7. The computer-implemented method of claim 1, wherein the communication method is Transmission Control Protocol/Internet Protocol (TCP/IP).

8. The computer-implemented method of claim 1, where the communication method is Uniform Datagram Protocol (UDP).

9. The computer-implemented method of claim 1, wherein the communication method is Inter-Process Communication (IPC).

10. The computer-implemented method of claim 1, wherein the communication method is named pipes.

11. The computer-implemented method of claim 1, wherein the communication method is flat files.

12. The computer-implemented method of claim 1 further comprising accessing a communication parameter in the child description file, wherein the communication parameter is used to pass communication data between the parent program and the child program.

13. The computer-implemented method of claim 12, wherein the communication parameter specifies a description for the communication data, the description including any of a name, type, precision, nullability, choice list, and default value.

14. The computer-implemented method of claim 1, wherein the child program is an external program.

15. The computer-implemented method of claim 1, wherein the child program is an in-process component.

16. The computer-implemented method of claim 15, wherein invoking the child program from the parent program comprises adding the in-process component to the parent program's process name space.

17. The computer-implemented method of claim 1, wherein the metadata file comprises a file format.

18. The computer-implemented method of claim 17, wherein the child description file corresponds to the meta data file by conforming to the file format.

19. The computer-implemented method of claim 17, wherein the meta data file comprises a plurality of XML tags.

20. The computer-implemented method of claim 17, wherein the child description file conforms to the collection of XML tags.

21. An apparatus for extending a parent program to include the functionality of a child program comprising:
   a plurality of child description files, a processor; wherein each of the plurality of child description files contains fully customizable information describing how to invoke the child program and establish communication between the parent program and the child program, the information conforming to the language constraints and rules defined in a meta data file associated with the parent program; and
   the parent program configured to select a child description file from among a plurality of child description files, the child description file corresponding to a child program, the child description file comprising an invoking method indicator and a communication method indicator, the parent program being further configured to invoke the child program using an invoking method specified by the invoking method indicator and establish a communication between the parent program and the child program using a communication method specified by the communication method indicator accessing an invoking argument in the invoking method of the child description file, wherein the invoking argument is used to pass a parameter data between the parent program and the child program; and
   providing a user interface to receive user input data for an the first invoking argument if the first invoking argument data for the first invoking argument is not provided in the child description file, wherein the input data is validated against an invoking argument description provided in the child description file or constrained by a choice list description provided in the child description file; wherein the invoking argument specifies a description for the parameter data, the description including any of a name, type, precision, nullability, choice list, and default value.

22. The apparatus of claim 21, further comprising:
   a well-known location that is accessible to the parent program, wherein the parent program searches for the child description file in the well-known location prior to invoking the child program.

23. The apparatus of claim 21, wherein the well-known location is a preset directory.

24. The apparatus of claim 21, when the well-known location is a search path obtained from a configuration file.

25. The apparatus of claim 21, wherein the well-known location is a registry of an operating system.

26. The apparatus of claim 25 when the operating system is Microsoft Windows.

27. An article of manufacture comprising:
   a machine accessible storage medium including instructions that, when accessed by a machine, causes the machine to:
   invoke a parent program;
   select a child description file from a plurality of child description files, wherein the child description file contains information describing how to invoke a child program and establish communication between the parent program and the child program, the information conforming to the language constraints and rules defined in a meta data file associated with the parent program;
   access an invoking method indicator in the child description file, the invoking method indicator specifying an invoking method;
   access a communication method indicator in the child description file, the communication method indicator specifying a communication method; accessing an invoking argument in the invoking method of the child description file, wherein the invoking argument is used to pass a parameter data between the parent program and the child program; and
   providing a user interface to receive user input data for an the first invoking argument if the first invoking argument data for the first invoking argument is not provided in the child description file, wherein the input data is validated against an invoking argument description provided in the child description file or constrained by a choice list description provided in the child description file; wherein the invoking argument specifies a description for the parameter data, the description including any of a name, type, precision, nullability, choice list, and default value.
   invoke the child program from the parent program using the invoking method; and
   establish communication between the parent program and the child program using the communication method.

28. The article of claim 27 wherein the instructions further cause the machine to access the child description file in a well-known location.

29. The article of claim 28, wherein the well-known location is a preset directory.

30. The article of claim 28, wherein the well-known location is a search path obtained from a configuration file.

31. The article of claim 28, wherein the well-known location is a registry of an operating system.

32. The article of claim 31, wherein the operating system is Microsoft Windows.

33. The article of claim 27, when the meta data file comprises a plurality of XML tags.

34. The article of claim 33 when the child description file conforms to the plurality of XML tags.

35. The article of claim 27, comprising:
   a machine accessible storage medium including instructions that, when accessed by a machine, causes the machine to:
   invoke the child program and establish communication between the parent program and the child program in absence of any standard interface shared by the parent program and child program.

* * * * *